(12) United States Patent
Wu et al.

(10) Patent No.: US 11,727,688 B2
(45) Date of Patent: Aug. 15, 2023

(54) METHOD AND APPARATUS FOR LABELLING INFORMATION OF VIDEO FRAME, DEVICE, AND STORAGE MEDIUM

(71) Applicant: TENCENT TECHNOLOGY (SHENZHEN) COMPANY LIMITED, Shenzhen (CN)

(72) Inventors: Ruizheng Wu, Shenzhen (CN); Jiaya Jia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 137 days.

(21) Appl. No.: 17/473,940

(22) Filed: Sep. 13, 2021

(65) Prior Publication Data
US 2021/0406553 A1    Dec. 30, 2021

Related U.S. Application Data

(63) Continuation of application No. PCT/CN2020/106575, filed on Aug. 3, 2020.

(30) Foreign Application Priority Data

Aug. 29, 2019 (CN) .......................... 201910807774.8

(51) Int. Cl.
*G06K 9/00* (2022.01)
*G06V 20/40* (2022.01)

(52) U.S. Cl.
CPC .............. *G06V 20/48* (2022.01); *G06V 20/46* (2022.01)

(58) Field of Classification Search
CPC ........ G06V 10/75; G06V 10/82; G06V 20/40; G06V 20/46; G06V 20/48
See application file for complete search history.

(56) References Cited

U.S. PATENT DOCUMENTS 10,949,995 B2    3/2021   Gao
2016/0379080 A1 12/2016  Yalniz et al.
2020/0329217 A1* 10/2020 Sun ..................... H04N 21/8455

FOREIGN PATENT DOCUMENTS

CN        103324937 A    9/2013
CN        103914850 A    7/2014
(Continued)

OTHER PUBLICATIONS

K. K. Singh, F. Xiao and Y. J. Lee, "Track and Transfer: Watching Videos to Simulate Strong Human Supervision for Weakly-Supervised Object Detection," 2016 IEEE Conference on Computer Vision and Pattern Recognition (CVPR), Las Vegas, NV, USA, 2016, pp. 3548-3556 (Year: 2016).*

(Continued)

*Primary Examiner* — Michael J Vanchy, Jr.
(74) *Attorney, Agent, or Firm* — Anova Law Group PLLC

(57) ABSTRACT

A method and apparatus for labelling information of a video frame, includes: obtaining a video; performing feature extraction on a target video frame in the video, to obtain a target image feature of the target video frame; determining, according to image feature matching degrees between the target video frame and labelled video frames, a guide video frame of the target video frame from the labelled video frames, the guide video frame being used for guiding the target video frame for information labelling, and the image feature matching degrees being matching degrees between the target image feature and image features corresponding to the labelled video frames; and generating target label information corresponding to the target video frame according to label information corresponding to the guide video frame.

15 Claims, 10 Drawing Sheets

(56) References Cited

FOREIGN PATENT DOCUMENTS

| CN | 107886104 A | 4/2018 |
|---|---|---|
| CN | 108965687 A | 12/2018 |
| CN | 108965852 A | 12/2018 |
| CN | 109325967 A | 2/2019 |
| CN | 109753975 A | 5/2019 |
| CN | 110163095 A | 8/2019 |
| CN | 110176027 A | 8/2019 |
| CN | 110503074 A | 11/2019 |

OTHER PUBLICATIONS

European Patent Office European Search Report for Application No. 20859548.8 dated Oct. 8, 25, 2022 9 pages.
Singh Krishna Kumar et al:"Track and Transfer: Watching Videos to Simulate Strong Human Supervision for Weakly-Supervised Object Detection" 2016 IEEE Conference on Computer Vision and Pattern Recognition (CVPR), Jun. 27, 2016 9 pages.
Liu Sifei et al : "Switchable Temporal Propagation Network", SAT 2015 18th International Conference, Austin, TX, USA,, Oct. 6, 2018 (Oct. 6, 2018) 16 pages.
Vijay Badrinarayanan et al: "Label propagation in video sequences", 2010 IEEE Conference on Computer Vision and Pattern Recognition, Jun. 2010 8 pages.
Gedas Bertasiuset al:"Learning Temporal Pose Estimation from Sparsely-Labeled Videos",Preprint. Under review, Jun. 6, 2019 11 pages.
The World Intellectual Property Organization (WIPO) International Search Report for PCT/CN2020/106575 dated Nov. 6, 2020 6 Pages (including translation).
The State Intellectual Property Office of the People's Republic of China (SIPO) Office Action 1 for for 201910807774.8 dated Aug. 4, 2021 12 Pages (including translation).
Seoung Wug Oh et al., "Video Object Segmentation using Space-Time Memory Networks," arXiv:1904.00607, Aug. 12, 2019 (Aug. 12, 2019). 10 pages.
Jun Chu et al., "Target Tracking Based on Occlusion Detection and Spatio-Temporal Context Information", Pattern recognition and artificial intelligence, vol. 30, No. 8, Aug. 31, 2017, pp. 718-727. 10 pages.
Huan Zhang et al., "Tagging and Indexing Sport Video Based on Hierarchical Semantics", Computer Applications and Software, vol. 29, No. 10, Oct. 31, 2012, pp. 258-260. 3 pages.

* cited by examiner

METHOD AND APPARATUS FOR LABELLING INFORMATION OF VIDEO FRAME, DEVICE, AND STORAGE MEDIUM

CROSS-REFERENCES TO RELATED APPLICATIONS

This application is a continuation application of PCT Patent Application No. PCT/CN2020/106575, entitled "VIDEO FRAME INFORMATION LABELING METHOD, DEVICE AND APPARATUS, AND STORAGE MEDIUM" and filed on Aug. 3, 2020, which claim priority to Chinese Patent Application No. 201910807774.8, entitled "METHOD AND APPARATUS FOR LABELLING INFORMATION OF VIDEO FRAME, DEVICE, AND STORAGE MEDIUM" filed on Aug. 29, 2019, the entire contents of both of which are incorporated herein by reference.

FIELD OF THE TECHNOLOGY

Embodiments of the present disclosure relate to the field of artificial intelligence (AI), and in particular, to a method and apparatus for labelling information of a video frame, a device, and a storage medium.

BACKGROUND OF THE DISCLOSURE

Video label information propagation is an important technology in the field of video processing, and is often used to execute tasks such as video object tracking and grayscale video coloring.

In the related art, a deep learning-based method is generally used to model a pixel relationship between video frames based on a convolutional neural network, so that label information between the video frames is propagated based on the pixel relationship. When the foregoing method is used, a convolutional neural network is generally used to model adjacent video frames. Correspondingly, when a constructed model is used to propagate label information, a previous video frame of a current video frame is determined as a guide video frame, to transmit label information of the guide video frame to the current video frame by using the model.

However, when the foregoing method is used to use adjacent video frames as guide video frames, if label information of a video frame is missing due to reasons such as object occlusion and rapid movement, information propagation of all subsequent video frames is directly affected, and propagation errors of the label information continuously accumulate, resulting in a poor propagation effect of the label information.

SUMMARY

Embodiments of the present disclosure provide a method and apparatus for labelling information of a video frame, a device, and a storage medium, to improve accuracy of label information generated when information labelling is performed on a video frame. The technical solutions are as follows:

According to an aspect, an embodiment of the present disclosure provides a method for labelling information of a video frame. The method is applied to a computer device and includes:

obtaining a video;

performing feature extraction on a target video frame in the video, to obtain a target image feature of the target video frame;

determining, according to image feature matching degrees between the target video frame and labelled video frames, a guide video frame of the target video frame from the labelled video frames, the labelled video frames belonging to the video, the guide video frame being used for guiding the target video frame for information labelling, the image feature matching degrees being matching degrees between the target image feature and image features corresponding to the labelled video frames, and an image feature matching degree between the guide video frame and the target video frame being higher than image feature matching degrees between other labelled video frames and the target video frame; and generating target label information corresponding to the target video frame according to label information corresponding to the guide video frame.

According to another aspect, an embodiment of the present disclosure provides an apparatus for labelling information of a video frame, including:

an obtaining module, configured to obtain a video;

a feature extraction module, configured to perform feature extraction on a target video frame in the video, to obtain a target image feature of the target video frame;

a guide frame determining module, configured to determine, according to image feature matching degrees between the target video frame and labelled video frames, a guide video frame of the target video frame from the labelled video frames, the labelled video frames belonging to the video, the guide video frame being used for guiding the target video frame for information labelling, the image feature matching degrees being matching degrees between the target image feature and image features corresponding to the labelled video frames, and an image feature matching degree between the guide video frame and the target video frame being higher than image feature matching degrees between other labelled video frames and the target video frame; and a generation module, configured to generate target label information corresponding to the target video frame according to label information corresponding to the guide video frame.

According to another aspect, an embodiment of the present disclosure provides a computer device, including a processor and a memory, the memory storing at least one instruction, at least one program, a code set, or an instruction set, the at least one instruction, the at least one program, the code set, or the instruction set being loaded and executed by the processor to implement the method for labelling information of a video frame described in the foregoing aspect.

According to another aspect, a non-transitory computer-readable storage medium is provided, storing at least one instruction, at least one program, a code set, or an instruction set, the at least one instruction, the at least one program, the code set, or the instruction set being loaded and executed by a processor to implement the method for labelling information of a video frame described in the foregoing aspect.

According to another aspect, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the method for labelling information of a video frame provided in the foregoing aspect.

The technical solutions provided in the embodiments of the present disclosure produce at least the following beneficial effects:

When information labelling is performed on a target video frame in a video, a target image feature of the target video frame is obtained by performing feature extraction on the target video frame; and a guide video frame corresponding to the target video frame is determined from labelled video frames according to image feature matching degrees between the target video frame and the labelled video frames in the video, thereby generating target label information of the target video frame based on label information of the guide video frame. In the embodiments of the present disclosure, an adjacent video frame is not directly selected as the guide video frame, but instead, a labelled video frame having a high image feature matching degree with the target video frame is selected as the guide video frame based on an image feature of the target video frame, thereby improving selection quality for the guide video frame, and further improving accuracy of the generated label information. In addition, propagation errors of the label information do not accumulate, thereby improving propagation quality for the label information.

DESCRIPTION OF EMBODIMENTS

Figure 1:
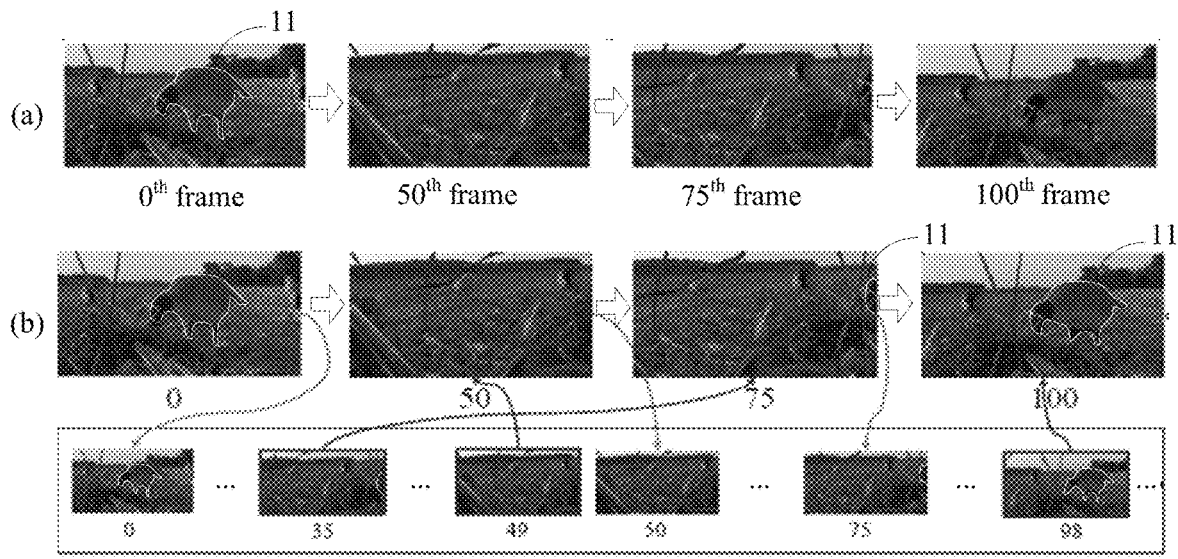
FIG. 1 is a schematic implementation diagram of labelling an object in a video by using the related art and a method according to an embodiment of the present disclosure.

To make objectives, technical solutions, and advantages of the present disclosure clearer, the following further describes implementations of the present disclosure in detail with reference to the accompanying drawings.

Computer vision (CV) is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The CV technologies usually include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further include biological feature recognition technologies such as common face recognition and fingerprint recognition. The method provided in the embodiments of the present disclosure relates to the application of the CV technologies in the field of video information labelling.

For a video frame sequence $x\_t$ ($t=0, 1, \ldots, T$), when label information is preset for a video frame in the video frame sequence, a process of setting label information for another video frame in the video frame sequence according to the label information is video label information propagation. For example, label information $y\_0$ is preset for a $0^{th}$ video frame $x\_0$ in the video frame sequence. According to the label information $y\_0$, label information $y\_1$ of a $1^{st}$ video frame, label information $y\_2$ of a $2^{nd}$ video frame, ..., and label information $y\_T$ of a $T^{th}$ video frame are calculated sequentially, and this process is the video label information propagation.

In the related art, an adjacent video frame is used as a guide video frame of a current video frame, and label information in the guide video frame is used to generate label information for the current video frame. For example, when the $0^{th}$ video frame in the video frame sequence $x\_t$ includes the label information $y\_0$, the $1^{st}$ video frame uses the $0^{th}$ video frame as a guide video frame, to generate the label information $y\_1$ of the $1^{st}$ video frame according to the label information $y\_0$; the $2^{nd}$ video frame uses the $1^{st}$ video frame as a guide video frame, to generate the label information $y\_2$ of the $2^{nd}$ video frame according to the label information $y\_1$; and so on, until label information is set for all video frames.

However, when the above manner is used, propagation errors continuously accumulate during propagation of label information. Especially when an object to be labelled in a video frame is occluded or temporarily leaves, correct label information probably cannot be set for all video frames after the video frame, and finally a propagation effect of label information is affected.

Schematically, as shown in (a) in FIG. 1, label information is set for a $0^{th}$ frame in a video frame sequence in a manual labelling manner, and the label information is used for labelling an object 11 (a region enclosed by a white line in FIG. 1) in a video frame. If an adjacent video frame is used as a guide video frame for label information propagation, because the object 11 in a $50^{th}$ video frame is separated from a video frame picture, correct label information cannot be set for video frames starting from the $50^{th}$ video frame.

However, actually, the object 11 gradually enters the video frame picture starting from the 75th frame.

Figure 2:
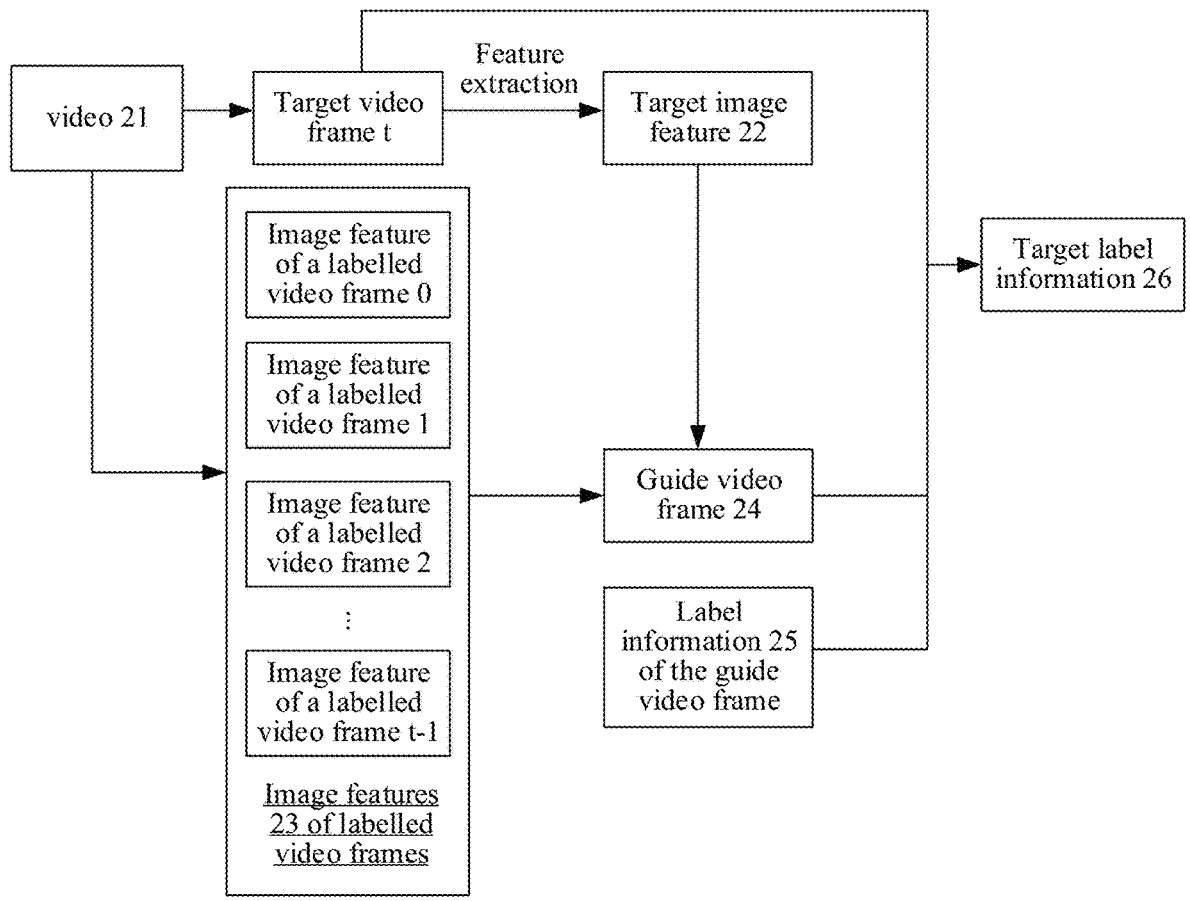
FIG. 2 is a schematic principle diagram of a method for labelling information of a video frame according to an embodiment of the present disclosure.

To improve accuracy of label information in the video, as shown in FIG. 2, in this embodiment of the present disclosure, when information labelling needs to be performed on a target video frame tin a video 21 to be processed, an adjacent video frame (that is, a video frame t−1) of the target video frame t is not directly used as a guide video frame, and instead, feature extraction is first performed on the target video frame t, to obtain a target image feature 22 of the target video frame t. Based on cached image features 23 of labelled video frames and the target image feature 22, a computer device selects a video frame with a high image feature matching degree with the target video frame t from the labelled video frames as a guide video frame 24. Further, the computer device generates target label information 26 for the target video frame t according to the guide video frame 24, label information 25 of the guide video frame, and the target video frame t, to complete information labelling of the target video frame t.

Schematically, as shown in (b) in FIG. 1, by using the method provided in this embodiment of the present disclosure, when label information is generated for the 75th video frame, the computer device does not determine a 74th video frame as a guide video frame, and instead, determines a 35th video frame as a guide video frame based on an image feature matching degree, and labels the object 11 in the 75th video frame based on label information of the guide video frame. Similarly, when label information is generated for a 100th video frame, the computer device determines a 98th video frame as a guide video frame, and finally labels the object 11 in the 100th video frame. As can be seen, by using the method provided in this embodiment of the present disclosure, even if an object to be labeled in an intermediate video frame is occluded or temporarily leaves, the computer device can still accurately label subsequent video frames. In addition, because label information is not transmitted in a chain-type manner between video frames, propagation errors generated during propagation can be avoided, thereby improving accuracy of labelling video frames.

An exemplary description is made below for application scenarios of a method for labelling information of a video frame according to an embodiment of the present disclosure.

1. Automatic Tracking and Positioning for a Video Object

In the present disclosure scenario, the method for labelling information of a video frame provided in this embodiment of the present disclosure may be applied to an application having functions of automatically tracking and positioning a video object such as an indoor monitoring application, a road monitoring application, and a parking lot monitoring application. During automatic tracking and positioning for an object, a user first imports a video into the application, and then labels an object that needs to be automatically tracked and positioned in a video frame of the video. The application generates label information for other video frames in the video according to initial label information, and further labels and displays the object to be automatically tracked and positioned in each video frame according to the label information.

Figure 3:
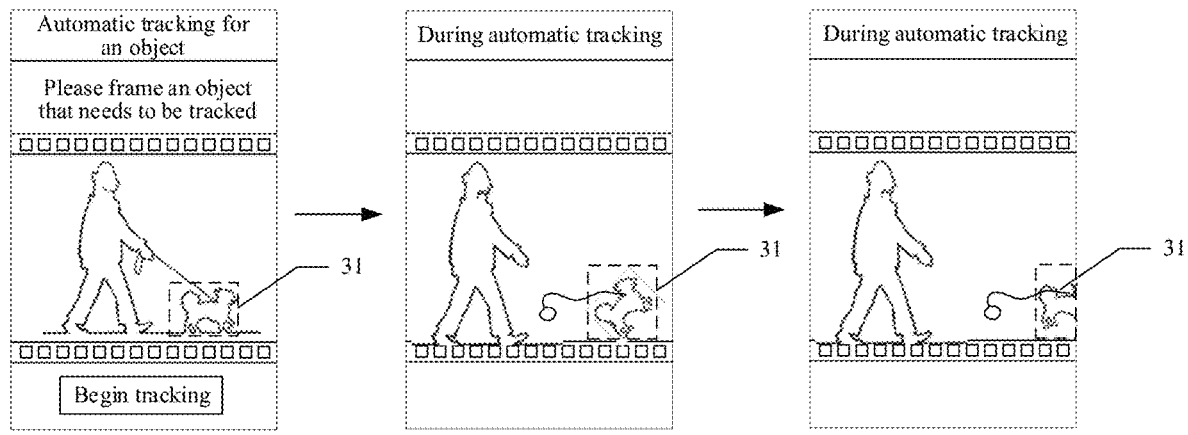
FIG. 3 is a schematic interface diagram of a process of automatically tracking and positioning an object in a video.

Schematically, as shown in FIG. 3, after the video is imported into the application, an application interface displays a first video frame in the video, and prompts the user to label the object to be tracked through framing. The user uses a dashed box 31 to frame an object "dog" to be tracked and clicks a start tracking control. The application then generates label information for each video frame in the video in sequence according to the first video frame and the label information thereof, and uses the dashed box 31 to frame and display the dog in the video frame in real time according to the generated label information.

2. Automatic Coloring of a Grayscale (Black and White) Video

In the present disclosure scenario, the method for labelling information of a video frame provided in this embodiment of the present disclosure may be applied to an application having a video coloring function, such as a video editing application. During coloring of a video, the user first colors a video frame in a grayscale video, and then inputs the grayscale video including initial color information into the application. The application generates color label information for other video frames in the video according to initial color label information, then colors each video frame according to the generated color label information, and finally outputs a color video.

Figure 4:
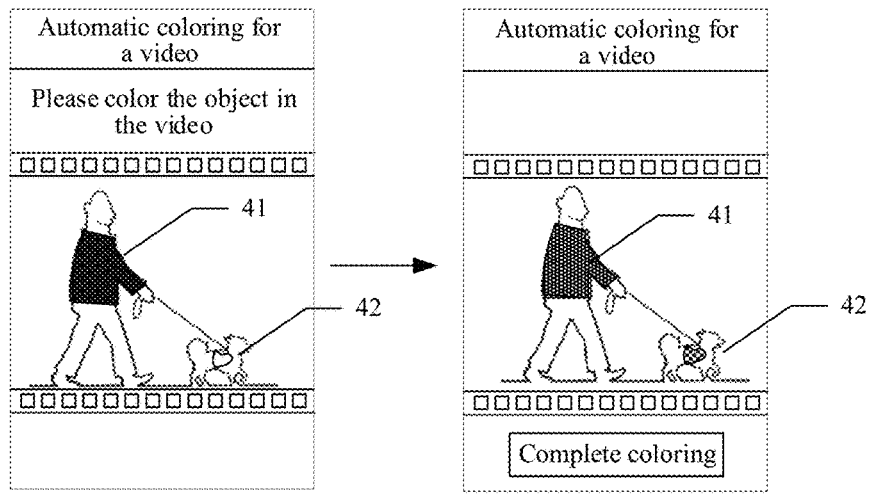
FIG. 4 is a schematic interface diagram of a process of coloring a grayscale video.
Figure 4:
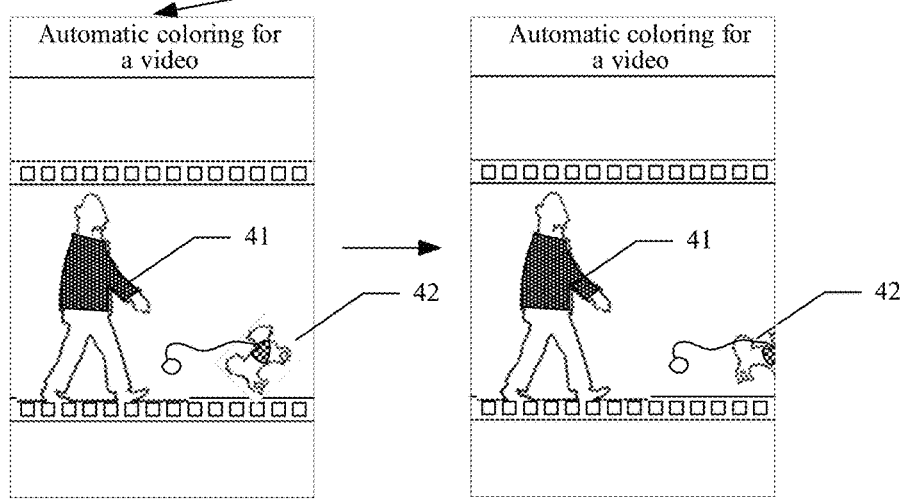

Schematically, as shown in FIG. 4, the user first colors the first video frame in the grayscale video (coloring a person 41 and a dog 42 separately), and then inputs the colored grayscale video into the application. According to color label information of the first video frame, the application generates color label information for each video frame in the video in sequence, colors the person 41 and the dog 42 in each video frame according to the color label information, and finally outputs a color video.

Certainly, in addition to being applied to the foregoing scenarios, the method provided in this embodiment of the present disclosure may be alternatively applied to other scenarios in which label information in the video needs to be propagated. A specific application scenario is not limited in the embodiments of the present disclosure.

The method for labelling information of a video frame provided in this embodiment of the present disclosure may be applied to a computer device such as a terminal or a server. In one embodiment, the method for labelling information of a video frame provided in this embodiment of the present disclosure may be implemented as an application or a part of the application, and is installed in a terminal, to cause the terminal to have a function of automatically setting label information for a video frame in a video; or the method may be applied to a backend server of the application, so that the function of information labelling for a video frame is provided by the server for the application in the terminal.

Figure 5:
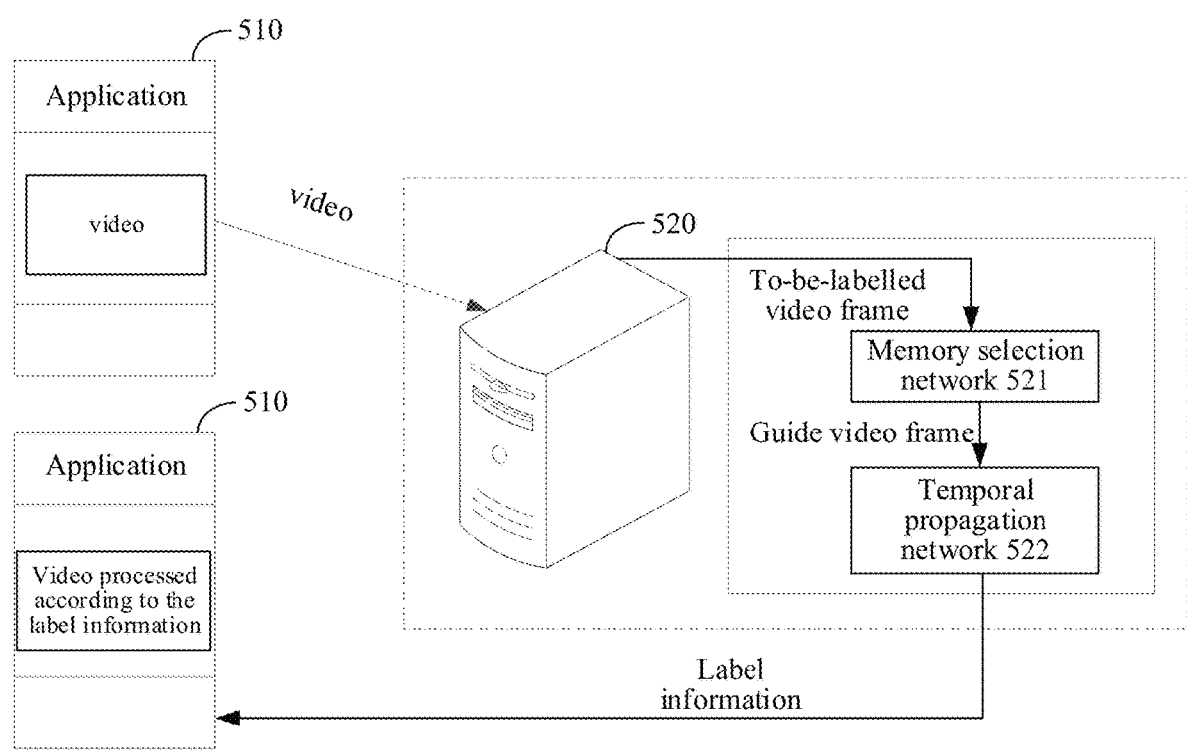
FIG. 5 is a schematic diagram of an implementation environment according to an exemplary embodiment of the present disclosure.

FIG. 5 is a schematic diagram of an implementation environment according to an exemplary embodiment of the present disclosure. The implement environment includes a terminal 510 and a server 520. The terminal 510 is in data communication with the server 520 through a communication network. In some embodiments, the communication network may be a wired network or a wireless network, and the communication network may be at least one of a local area network, a metropolitan area network, and a wide area network.

An application with requirements of information labelling for a video frame is installed on the terminal 510. The application may be a monitoring application, a video coloring application, or the like. This is not limited in this embodiment of the present disclosure. In some embodiments, the terminal 510 may be a mobile terminal such as a mobile phone, a tablet computer, a portable laptop computer, or an assistant device for a visually impaired person, or may be a terminal such as a desktop computer or a projection computer. This is not limited in this embodiment of the present disclosure.

The server 520 may be implemented as a server or may be implemented as a server cluster formed by a set of servers, and may be a physical server or may be implemented as a cloud server. In one embodiment, the server 520 is a backend server of the application in the terminal 510.

As shown in FIG. 5, in this embodiment of the present disclosure, a pre-trained memory selection network (MSN) 521 and a temporal propagation network (TPN) 522 are provided in the server 520. The MSN 521 is configured to select a guide video frame of a to-be-labelled video frame from labelled video frames. The TPN 522 is configured to generate label information for the to-be-labelled video frame according to the guide video frame selected by the MSN 521.

In one application scenario, the server 520 generates label information for video frames in a video to be processed by using the MSN 521 and the TPN 522, and then feeds back the label information to the terminal 510. The terminal 510 processes the video according to the label information, to display the processed video. When the label information is object segmentation information, the terminal 510 frames and displays target objects in the video frames according to the object segmentation information; and when the label information is color information, the terminal 510 colors the objects in the video frames according to the color information.

In another embodiment, the MSN 521 and TPN 522 may alternatively be implemented as a part or all of the application. Correspondingly, the terminal 510 may perform information labelling on the video frames locally without the help of the server 520. This is not limited in this embodiment.

For ease of description, the following embodiments are described by using an example in which the method for labelling information of a video frame is performed by a computer device.

Figure 6:
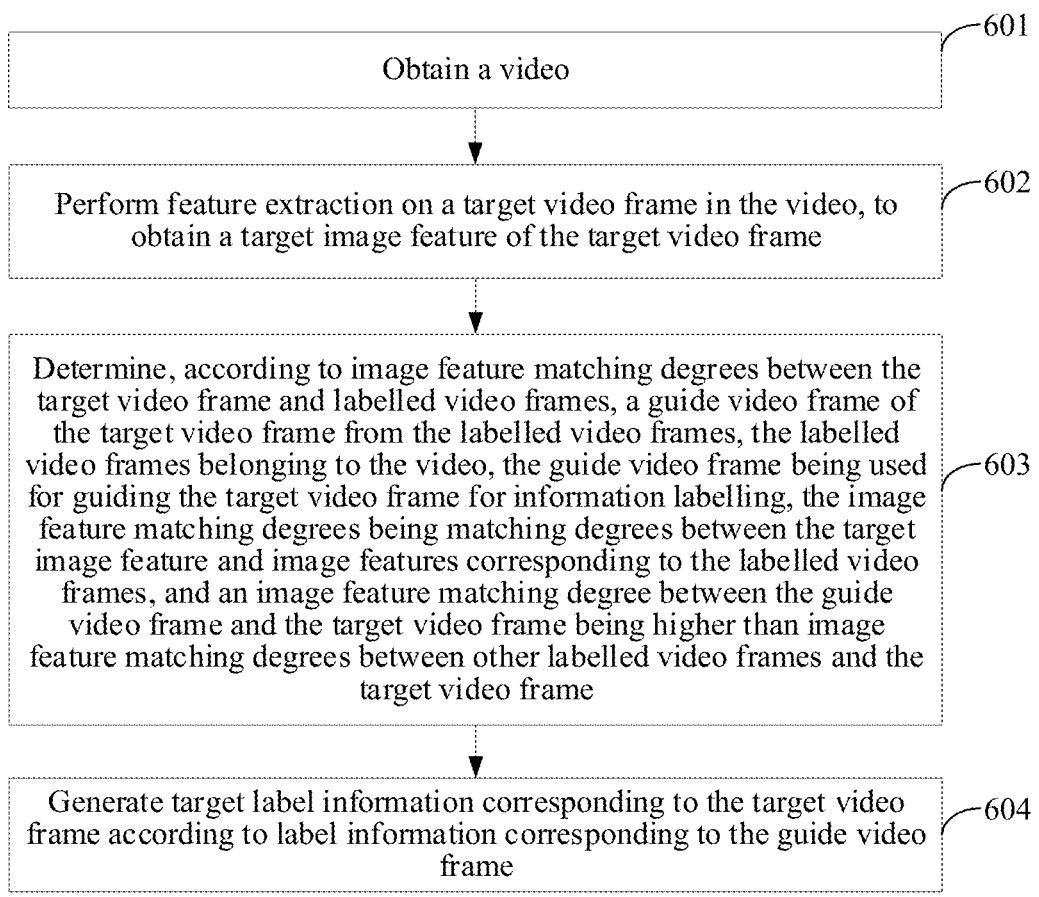
FIG. 6 is a flowchart of a method for labelling information of a video frame according to an exemplary embodiment of the present disclosure.

FIG. 6 is a flowchart of a method for labelling information of a video frame according to an exemplary embodiment of the present disclosure. In this embodiment, a description is made by using an example in which the method is applied to a computer device. The method includes the following steps:

Step 601. Obtain a video.

The video may be a real-time stream media video, a captured video, or a downloaded video. This is not limited in this embodiment of the present disclosure.

In one embodiment, the video includes an initially labelled video frame, and the initially labelled video frame is a video frame with preset label information. The label information of the initially labelled video frame may be manually set by the user, and there is at least one initially labelled video frame.

In a schematic example, a $0^{th}$ video frame of the video is the initially labelled video frame. Certainly, in another embodiment, the initially labelled video frame may alternatively not be the $0^{th}$ frame (that is, not the first frame), but any frame in the video (for example, a frame with the richest image content, or a frame including all objects to be labelled). This is not limited in this embodiment of the present disclosure.

In some embodiments, when the video needs to be colored, that is, when the video is a grayscale video, the label information may be color information of the video frame. For example, the label information is a red-green-blue (RGB) value of each pixel in the video frame. When an object in the video needs to be tracked and positioned, the label information may be object segmentation information. For example, the label information is pixel coordinates of a pixel corresponding to a target object in the video frame. In addition to the label information in the foregoing represen-tation form, the label information may alternatively be represented in another form. This is not limited in this embodiment of the present disclosure.

Step 602. Perform feature extraction on a target video frame in the video, to obtain a target image feature of the target video frame.

In one embodiment, the computer device generates label information for each video frame in the video in sequence, and the target video frame is the video frame currently processed by the computer device. For example, when the initially labelled video frame in the video is the $0^{th}$ video frame, the computer device starts from a $1^{st}$ video frame to generate label information for each video frame.

Different from directly using an adjacent video frame (for example, a previous video frame of the target video frame) of a target video frame as a guide video frame in the related art, in this embodiment of the present disclosure, the computer device first performs feature extraction on the target video frame, to obtain the target image feature of the target video frame.

In some embodiments, the computer device inputs the target video frame into a pre-trained feature extraction network to obtain the target image feature outputted by the feature extraction network. The feature extraction network may be obtained through training based on a deep convolutional neural network. For example, a visual geometry group (VGG) network structure may be adopted for the feature extraction network, and a size of an outputted feature map (that is, the target image feature) is $\frac{1}{32}$ of the inputted video frame. A specific manner of extracting the image feature is not limited in this embodiment of the present disclosure.

Step 603. Determine, according to image feature matching degrees between the target video frame and labelled video frames, a guide video frame of the target video frame from the labelled video frames, the labelled video frames belonging to the video, the guide video frame being used for guiding the target video frame for information labelling, the image feature matching degrees being matching degrees between the target image feature and image features corresponding to the labelled video frames, and an image feature matching degree between the guide video frame and the target video frame being higher than image feature matching degrees between other labelled video frames and the target video frame.

In one embodiment, the computer device caches the image features corresponding to the labelled video frames (that is, a memory function is implemented). When selecting the guide video frame, the computer device calculates the matching degrees between the target image feature and the image features corresponding to the labelled video frames, to obtain the image feature matching degrees between the target video frame and the labelled video frames, and then determines the guide video frame according to the image feature matching degrees (that is, a selection function is implemented).

In a schematic example, the $0^{th}$ video frame in the video is the initially labelled video frame, a guide video frame of the $1^{st}$ video frame is the $0^{th}$ video frame, a guide video frame of a $2^{nd}$ video frame is determined from the $0^{th}$ video frame and the $1^{st}$ video frame, and so on. The guide video frame of an $n^{th}$ video frame is determined from the $0^{th}$ video frame to an $(n-1)^{th}$ video frame.

In this example, a description is made by using an example in which the guide video frame is determined merely from video frames previous to the target video frame. In another embodiment, the guide video frame may alternatively be determined from video frames (on which information labelling has been completed) after the target video frame. This is not limited in this embodiment.

Step 604. Generate target label information corresponding to the target video frame according to label information corresponding to the guide video frame.

Further, the computer device generates target label information corresponding to the target video frame according to label information corresponding to the guide video frame.

In some embodiments, if a target video frame x_t, corresponds to guide video frame x_g, and the guide video frame x_g corresponds to label information y_g, a process of calculating label information y_t corresponding to the target video frame x_t may be represented as:

$$y\_t = P(x\_t, x\_g, y\_g),$$

where P is constructed based on a convolutional neural network.

Based on the above, in this embodiment of the present disclosure, when information labelling is performed on the target video frame in the video, the target image feature of the target video frame is obtained by performing feature extraction on the target video frame; and the guide video frame corresponding to the target video frame is determined from the labelled video frames according to the image feature matching degrees between the target video frame and the labelled video frames in the video, thereby generating the target label information of the target video frame based on the label information of the guide video frame. In this embodiment of the present disclosure, an adjacent video frame is not directly selected as the guide video frame, but instead, a labelled video frame having a high image feature matching degree with the target video frame is selected as the guide video frame based on the image feature of the target video frame, thereby improving selection quality for the guide video frame, and further improving accuracy of the generated label information. In addition, propagation errors of the label information do not accumulate, thereby improving propagation quality for the label information.

In one embodiment, in this embodiment of the present disclosure, a pre-constructed MSN is stored in the computer device. Correspondingly, when determining the guide video frame of the target video frame, the computer device inputs the extracted target image feature into the MSN. The MSN then selects a labelled video frame from the labelled video frames as a guide video frame and outputs the guide video frame.

In some embodiments, a "memory pool+selection network" structure is adopted for the MSN. The memory pool stores the image features of the labelled video frames, and the selection network is configured to select the guide video frame from the labelled video frames according to the image features stored in the memory pool and the target image feature of the target video frame. In addition, the computer device further includes a TPN, and information labelling of the target video frame is performed by the TPN. The information labelling process of the video frame is described below with reference to the foregoing two networks.

Figure 7:
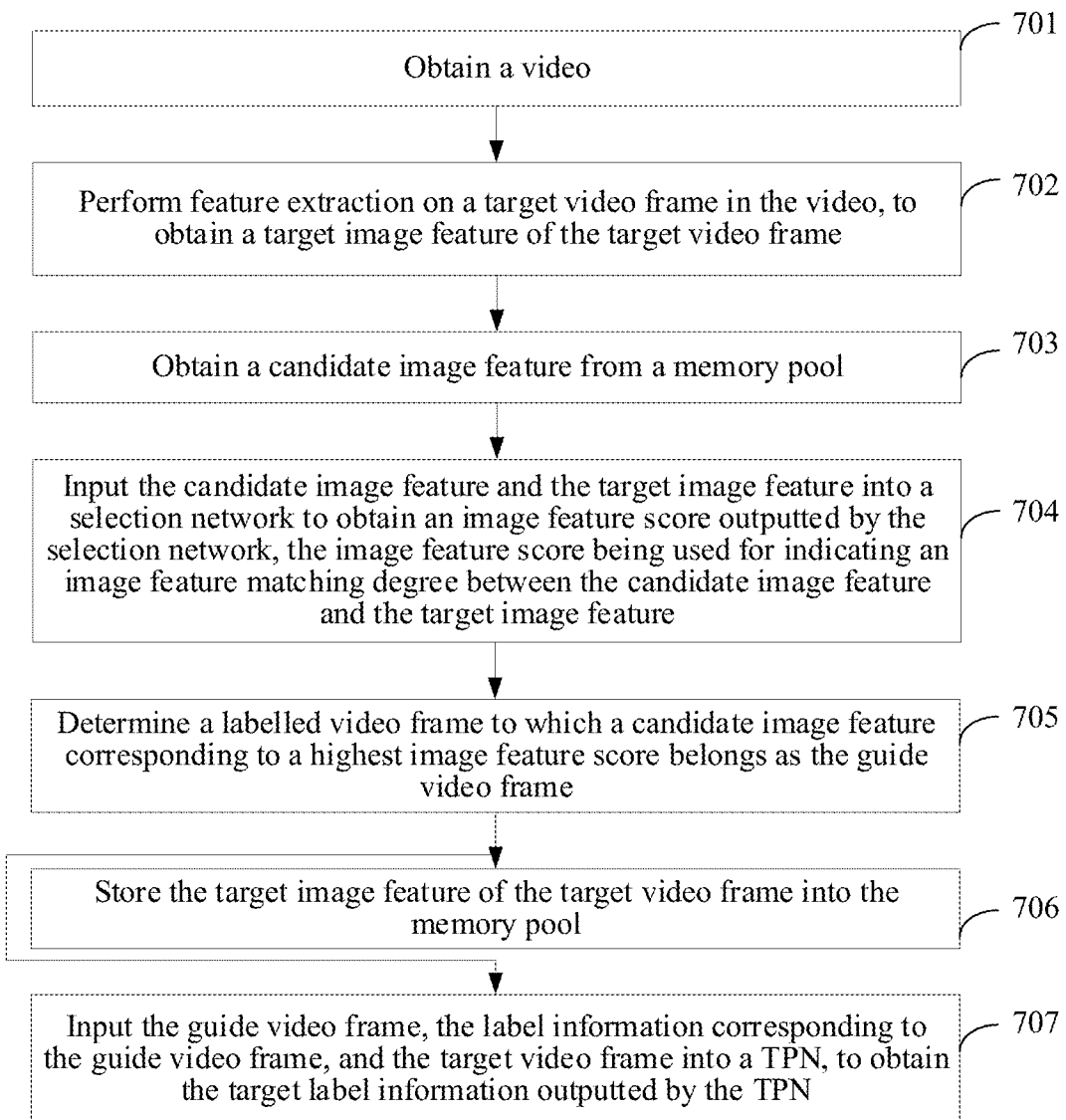
FIG. 7 is a flowchart of a method for labelling information of a video frame according to another exemplary embodiment of the present disclosure.

FIG. 7 is a flowchart of a method for labelling information of a video frame according to another exemplary embodiment of the present disclosure. In this embodiment, a description is made by using an example in which the method is applied to a computer device. The method includes the following steps:

Step 701. Obtain a video.

Step 702. Perform feature extraction on a target video frame in the video, to obtain a target image feature of the target video frame.

For the implementation of steps 701 to 702, reference may be made to steps 601 to 602, and details are not described again in this embodiment.

Step 703. Obtain a candidate image feature from a memory pool.

In one embodiment, candidate image features corresponding to the labelled video frames are sequentially stored in the memory pool, and correspondingly, the computer device obtains the candidate image features from the memory pool in sequence. For example, when the target video frame is a $t^{th}$ video frame, image features of a $0^{th}$ video frame to a $(t-1)^{th}$ video frame are sequentially stored in the memory pool, and the computer device obtains candidate image features from the memory pool according to a sequence of 0 to t−1.

In an initial stage of information labelling, the memory pool stores an image feature of an initially labelled video frame. Correspondingly, the computer device directly uses the initially labelled video frame as a guide video frame in the initial labelling stage.

Step 704. Input the candidate image feature and the target image feature into the selection network to obtain an image feature score outputted by the selection network, the image feature score being used for indicating an image feature matching degree between the candidate image feature and the target image feature.

In one embodiment, the selection network is a lightweight convolutional neural network, and is configured to output the image feature score between the image features according to the inputted image features. A higher image feature score indicates a higher matching degree between the image features. Correspondingly, a better information propagation effect produced when the labelled video frame corresponding to the candidate image feature is used as the guide video frame indicates higher accuracy of information labelling.

In some embodiments, for each candidate image feature in the memory pool, the computer device obtains an image feature score corresponding to the each candidate image feature through the foregoing steps.

However, with the continuous execution of information labelling, image features in the memory pool continuously increase (that is, a quantity of labelled video frames continuously increases). If all candidate image features in the memory pool are traversed, efficiency of information labelling of subsequent video frames gradually decreases.

To further improve the efficiency of information labelling, in some embodiments, the computer device obtains some candidate image features in the memory pool. Correspondingly, only image feature scores corresponding to the some candidate image features need to be outputted by using the selection network.

For the policy of selecting some candidate image features, in one embodiment, when a frame rate of the video is greater than a frame rate threshold, candidate image features corresponding to labelled video frames are obtained from the memory pool every predetermined quantity of frames. For example, the computer device obtains candidate image features corresponding to odd or even video frames in the memory pool (that is, obtains candidate image features corresponding to labelled video frames every other frame, and because an interval between adjacent video frames is relatively short, a difference between the corresponding image features is relatively small), or the computer device obtains candidate image features corresponding to labelled video frames every two frames.

For example, when the frame rate of the video is greater than 24 frames/second, the computer device obtains candidate image features corresponding to the odd video frames in the memory pool, and outputs image feature scores corresponding to the candidate image features by using the selection network.

In another embodiment, the computer device may alternatively obtain candidate image features of n adjacent labelled video frames (for example, 20 adjacent labelled video frames) of the target video frame from the memory pool. This is not limited in this embodiment of the present disclosure.

Figure 8:
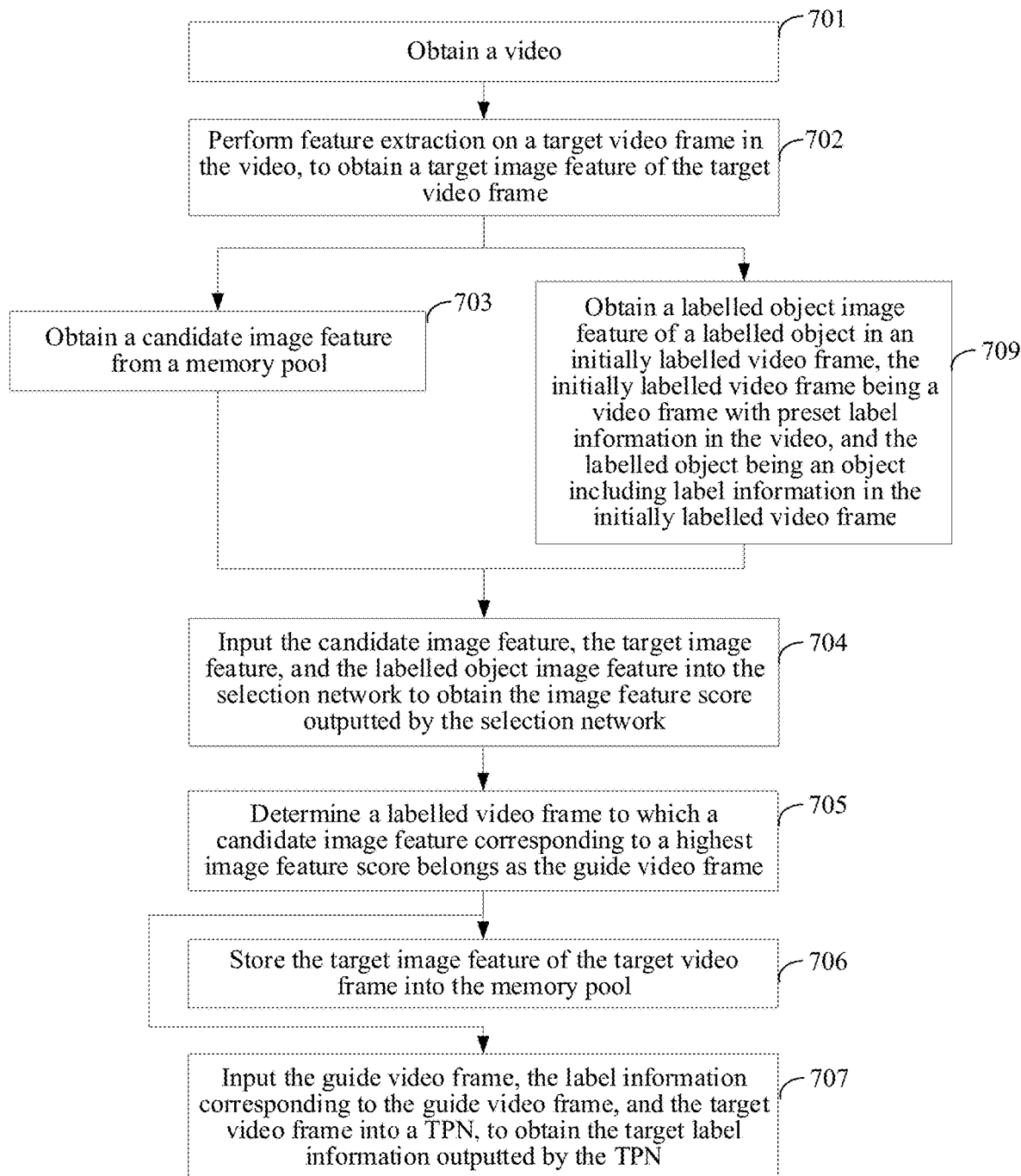
FIG. 8 is a flowchart of a method for labelling information of a video frame according to another exemplary embodiment of the present disclosure.

In the foregoing steps, the selection network only calculates the image feature score based on the candidate image feature and the target image feature, and the scoring dimension is relatively undiversified. To further improve the accuracy of the outputted image feature score, in one embodiment, on the basis of FIG. 7, as shown in FIG. 8, step 708 may be included after step 703, and correspondingly, step 704 may be replaced with step 709.

Step 708. Obtain a labelled object image feature of a labelled object in the initially labelled video frame, the initially labelled video frame being a video frame with preset label information in the video, and the labelled object being an object including label information in the initially labelled video frame.

To make full use of the initial label information corresponding to the initially labelled video frame, in one embodiment, when extracting the image feature of the initially labelled video frame, the computer device performs image feature extraction on the labelled object in the initially labelled video frame to obtain the labelled object image feature of the labelled object, where the labelled object image feature has the same size as the image feature of each video frame.

In some embodiments, the computer device determines the labelled object according to object segmentation information (used for segmenting different objects in the initially labelled video frame) of the initially labelled video frame, and then performs image feature extraction on the labelled object. In addition, when image feature extraction is performed by using convolutional neural network-based feature extractors, a feature extractor that performs image feature extraction on the video frame shares a weight of a feature extractor that performs image feature extraction on the labelled object.

Figure 9:
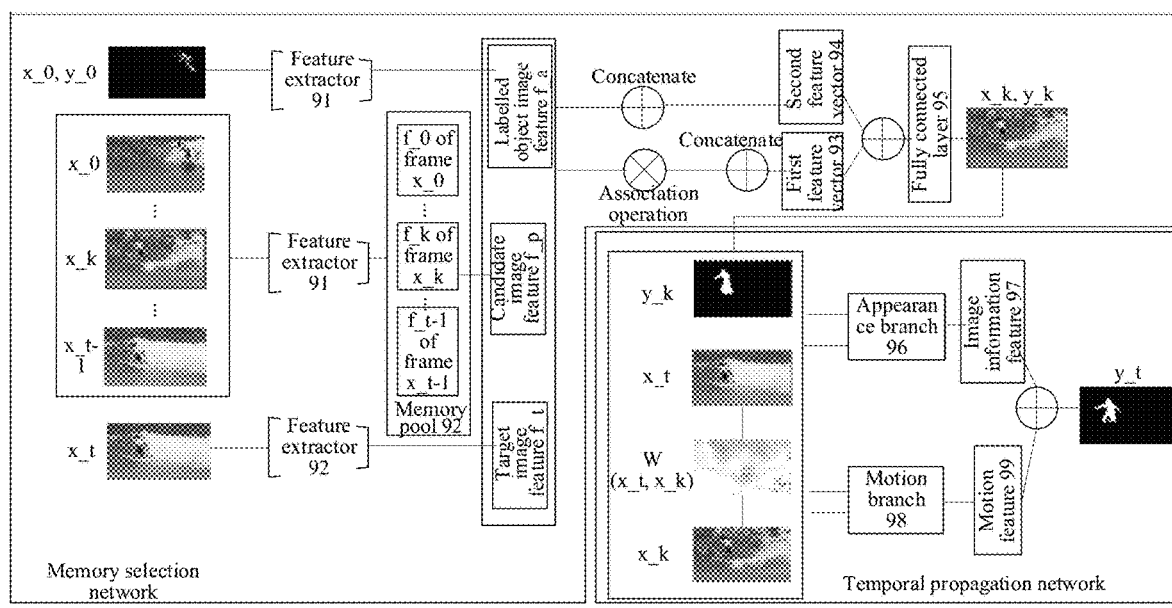
FIG. 9 is a schematic implementation diagram of the method for labelling information of a video frame shown in FIG. 8.

Schematically, as shown in FIG. 9, the computer device extracts a labelled object image feature f_a by using a feature extractor 91 according to initial label information y_0 corresponding to an initially labelled video frame x_0. In addition, during the information labelling, the computer device performs image feature extraction on video frames x_0 to x_t−1 by using the feature extractor 91, and stores extracted image features f_0 to f_t−1 into a memory pool 92. When determining a guide video frame of the video frame x_t, the computer device obtains the labelled object image feature f_a, and obtains a candidate image feature f_p from the memory pool 92.

Step 709. Input the candidate image feature, the target image feature, and the labelled object image feature into the selection network to obtain the image feature score outputted by the selection network.

Further, the computer device jointly inputs the candidate image feature, the target image feature, and the labelled object image feature into the selection network, and the selection network outputs the image feature score according to the candidate image feature, the target image feature, and the labelled object image feature.

In one embodiment, the selection network includes two branches, namely, a first selection branch and a second selection branch. The first selection branch uses an association operation result of two image features as an input, and the second selection branch uses concatenation of three image features as an input. Outputs of the first selection branch and the second selection branch are concatenated and finally inputted to a fully connected layer of the selection network. Finally, the fully connected layer outputs the image feature score. In some embodiments, this step may include the following steps.

1. Perform an association operation on any two image features among the candidate image feature, the target image feature, and the labelled object image feature to obtain an associated image feature, the associated image feature being used for indicating a similarity between the image features.

Before inputting the image feature into the first selection branch, the computer device first performs an association operation on any two image features among the candidate image feature, the target image feature, and the labelled object image feature to obtain an associated image feature.

In one embodiment, because the candidate image feature, the target image feature, and the labelled object image feature are all extracted by using the same feature extractor, the sizes of the three are the same. When performing the association operation, the computer device performs a pixel-wise similarity calculation on the candidate image feature and the target image feature to obtain a first associated image feature; performs a pixel-wise similarity calculation on the candidate image feature and the labelled object image feature to obtain a second associated image feature; and perform a pixel-wise similarity calculation on the target image feature and the labelled object image feature to obtain a third associated image feature.

Figure 10:
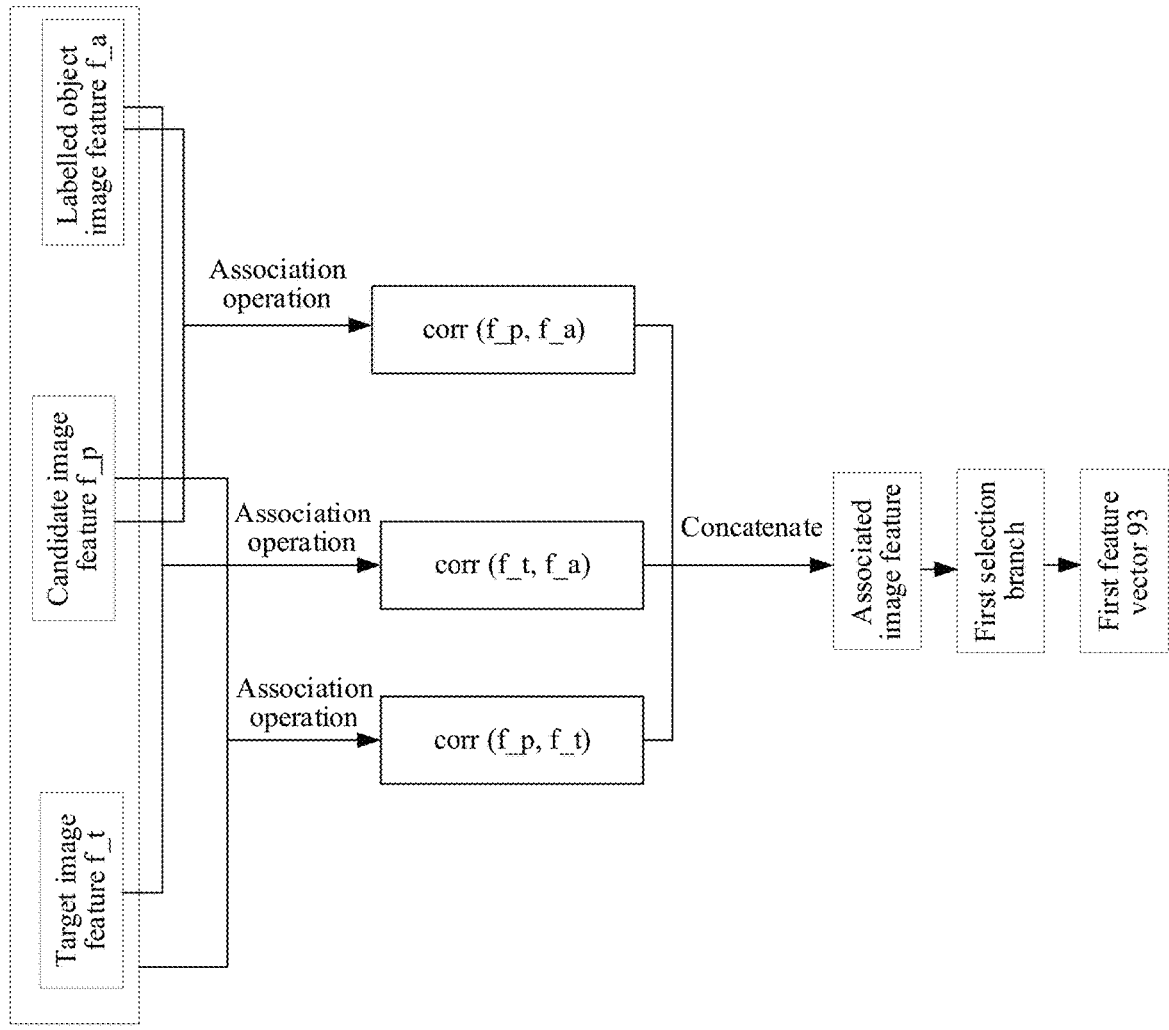
FIG. 10 is a schematic implementation diagram of performing feature extraction by using a first selection branch of a selection network.

Schematically, as shown in FIG. 9 and FIG. 10, the computer device performs the association operation on the candidate image feature f_p, the target image feature f_t, and the labelled object image feature f_a to obtain associated image features including: corr (f_p, f_a), corr (f_p, f_t), and corr (f_t, f_a).

2. Concatenate associated image features, and input the concatenated associated image features into the first selection branch, to obtain a first feature vector outputted by the first selection branch.

Further, the computer device concatenates the three associated image features obtained after the association operation, to input the concatenated associated image features into the first selection branch. The first selection branch further performs feature extraction on the concatenated associated image features, and finally outputs the first feature vector.

In some embodiments, the first selection branch is based on a convolutional neural network, that is, the first selection branch outputs the first feature vector after performing convolution, pooling, and activation operations on the concatenated associated image features. The specific structure of the first selection branch is not limited in this embodiment of the present disclosure.

Schematically, as shown in FIG. 9, the computer device performs feature extraction on the concatenated associated image features by using the first selection branch, to obtain a first feature vector 93.

3. Concatenate the candidate image feature, the target image feature, and the labelled object image feature to obtain a concatenated image feature (e.g., denoted as concat (f_p, f_t, f_a)), and input the concatenated image feature into the second selection branch to obtain a second feature vector outputted by the second selection branch. It can be understood that steps 1 and 2 are performed sequentially, and step 3 can be performed before, after, or simultaneously with steps 1 and 2.

The computer device concatenates the candidate image feature, the target image feature, and the labelled object image feature, to input a concatenation result into the second selection branch. The second selection branch further performs feature extraction, and finally outputs the second feature vector.

In some embodiments, the second selection branch is based on a convolutional neural network, that is, the second selection branch outputs the second feature vector after performing convolution, pooling, and activation operations on the concatenated image features. The specific structure of the second selection branch is not limited in this embodiment of the present disclosure.

Schematically, as shown in FIG. 9, the computer device performs feature extraction on the concatenated image features by using the second selection branch, to obtain a second feature vector 94.

4. Determine the image feature score according to the first feature vector and the second feature vector.

In one embodiment, the computer device concatenates the first feature vector and the second feature vector, and inputs the concatenated feature vectors into the fully connected layer to obtain the image feature score corresponding to the candidate image feature.

Schematically, as shown in FIG. 9, the computer device concatenates the first feature vector 93 and the second feature vector 94, and inputs the concatenated feature vectors into a fully connected layer 95. The fully connected layer 95 outputs the image feature score of the candidate image feature f_p.

For candidate image features in the memory pool, the computer device cyclically performs the foregoing steps 1 to 4, to obtain image feature scores between the target image feature and the candidate image features.

Step 705. Determine a labelled video frame corresponding to a highest image feature score as the guide video frame.

For the candidate image features, the computer device obtains the image feature scores corresponding to the candidate image features through the foregoing steps, and further determines the highest image feature score therein, thereby determining the labelled video frame to which a candidate image feature corresponding to the highest image feature score belongs as the guide video frame.

Schematically, as shown in FIG. 9, the computer device determines a video frame x_k as a guide video frame of the target video frame x_t according to an image feature score.

Step 706. Store the target image feature of the target video frame into the memory pool.

In one embodiment, after determining the guide video frame of the target video frame, the computer device stores the target image feature of the target video frame into the memory pool, so that the target image feature can be used as a reference when information labelling is performed on subsequent video frames.

Step 707. Input the guide video frame, the label information corresponding to the guide video frame, and the target video frame into a TPN, to obtain the target label information outputted by the TPN.

In this embodiment of the present disclosure, the computer device uses a pre-trained TPN to propagate the label information of the guide video frame to the target video frame, to complete the information labelling of the target video frame.

In one embodiment, the TPN includes an appearance branch and a motion branch. The appearance branch uses the target video frame and the label information of the guide video frame as an input, and is used for outputting an image information feature. The image information feature is used for representing estimated label information of pixels in the target video frame. The motion branch uses the label information of the guide video frame and a video frame optical flow between the guide video frame and the target video frame as an input, and is used for outputting a motion feature (indicating movement of an object in the video frame). In some embodiments, this step may include the following steps.

1. Input the label information corresponding to the guide video frame and the target video frame into the appearance branch, to obtain an image information feature outputted by the appearance branch.

In some embodiments, the appearance branch in this embodiment of the present disclosure is initialized from a pre-trained VGG16 network.

In one embodiment, the computer device inputs label information y_g of the guide video frame x_g and the target video frame x_t into the appearance branch, to obtain an image information feature f_app outputted by the appearance branch.

Schematically, as shown in FIG. 9, the guide video frame of the target video frame x_t is the guide video frame x_k, and the computer device inputs label information y_k of the guide video frame x_k and the target video frame x_t into an appearance branch 96 to obtain an image information feature 97 outputted by the appearance branch 96.

2. Determine a video frame optical flow between the guide video frame and the target video frame, and input the video frame optical flow and the label information corresponding to the guide video frame into the motion branch to obtain a motion feature outputted by the motion branch.

The video frame optical flow is used for indicating an image change between the video frames, and includes movement information of a moving object in the video frames. Therefore, movement of the object in the video frames may be determined by using the video frame optical flow.

In some embodiments, the video frame optical flow is a dense optical flow between the video frames, and is used for indicating movement of an object corresponding to pixels of the same coordinates in the guide video frame and the target video frame.

In one embodiment, the computer device determines a video frame optical flow W (x_t, x_g) between the guide video frame x_g and the target video frame x_t according to the guide video frame x_g and the target video frame x_t, thereby inputting the video frame optical flow W (x_t, x_g) and the label information y_g of the guide video frame x_g into the motion branch.

Schematically, as shown in FIG. 9, the guide video frame of the target video frame x_t is the guide video frame x_k. The computer device determines a video frame optical flow W (x_t, x_k) between the guide video frame x_k and the target video frame x_t according to the guide video frame x_k and the target video frame x_t, and inputs the video frame optical flow W (x_t, x_k) and the label information y_k of the guide video frame x_k into a motion branch 98, to obtain a motion feature 99 outputted by the motion branch 98.

In some embodiments, the video frame optical flow between the guide video frame and the target video frame is calculated by using a pre-trained flownet2.0, and the motion branch is initialized from the pre-trained VGG16 network.

There is no strict sequence between steps 1 and 2, that is, steps 1 and 2 may be performed synchronously. This is not limited in this embodiment.

3. Determine the target label information according to the image information feature and the motion feature.

In one embodiment, the computer device performs feature fusion on the image information feature and the motion feature, performs convolution processing on the fused features by using a convolution layer, and finally obtains the target label information of the target video frame.

Schematically, as shown in FIG. 9, after fusing the image information feature 97 and the motion feature 99, the computer device finally outputs the target label information y_t of the target video frame x_t by using a convolutional layer (not shown in the figure).

In this embodiment, the computer device inputs the candidate image feature, the target image feature, and the labelled object image feature into the selection network, and the two selection branches of the selection network perform feature extraction respectively, thereby enriching the feature extraction dimension of the image features and improving the accuracy of the image feature score calculated subsequently.

In addition, in this embodiment, the computer device uses the appearance branch and the motion branch of the TPN to perform feature extraction respectively, and fuses the features extracted by the two branches to finally obtain the target label information of the target video frame, thereby helping improve the accuracy of information labelling.

Figure 11:
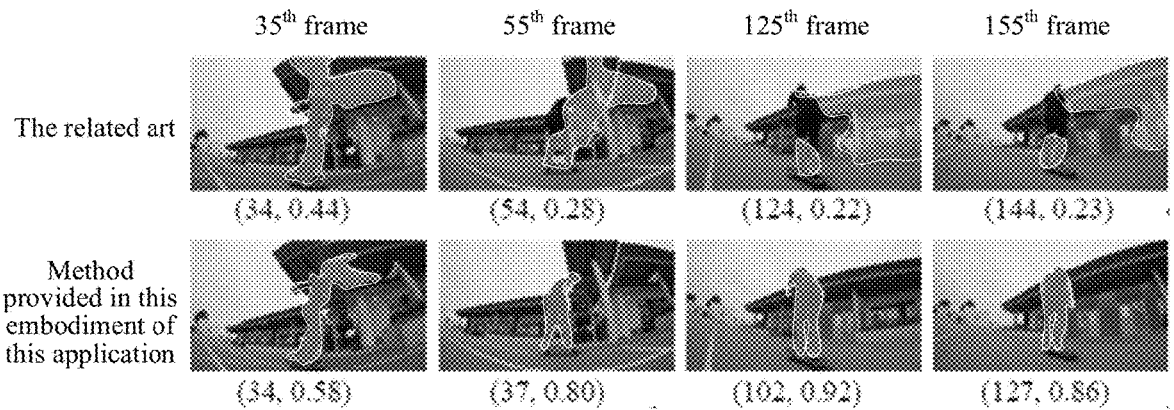
FIG. 11 is a comparison diagram of accuracy of label information in the related art and in an embodiment of the present disclosure.

In a schematic example, as shown in FIG. 11, by using a method provided in the related art, when a $35^{th}$ frame is labelled, a $34^{th}$ frame is used as a guide frame, and labelling accuracy is 0.44; when a $55^{th}$ frame is labelled, a $54^{th}$ frame is used as a guide frame, and labelling accuracy is 0.28; when a $125^{th}$ frame is labelled, a $124^{th}$ frame is used as a guide frame, and labelling accuracy is 0.22; and when a $155^{th}$ frame is labelled, a $154^{th}$ frame is used as a guide frame, and labelling accuracy is 0.23.

However, by using the method provided in this embodiment of the present disclosure, when the $35^{th}$ frame is labelled, the $34^{th}$ frame is used as the guide frame, and the labelling accuracy is 0.58; when the $55^{th}$ frame is labelled, the $37^{th}$ frame is used as the guide frame, and the labelling accuracy is 0.80; when the $125^{th}$ frame is labelled, the $102^{th}$ frame is used as the guide frame, and the labelling accuracy is 0.92; and when the $155^{th}$ frame is labelled, the $127^{th}$ frame is used as the guide frame, and the labelling accuracy is 0.86.

As can be seen, by using the method provided in the related art, with constant deepening of information propagation, the accuracy of information labelling becomes lower; while by using the method provided in this embodiment of the present disclosure, chain-type information propagation is not used, and thus the accuracy of information labelling is not affected by the depth of information propagation. Moreover, compared with the related art, by using the method provided in this embodiment of the present disclosure, the accuracy of the label information can be significantly improved.

Figure 12:
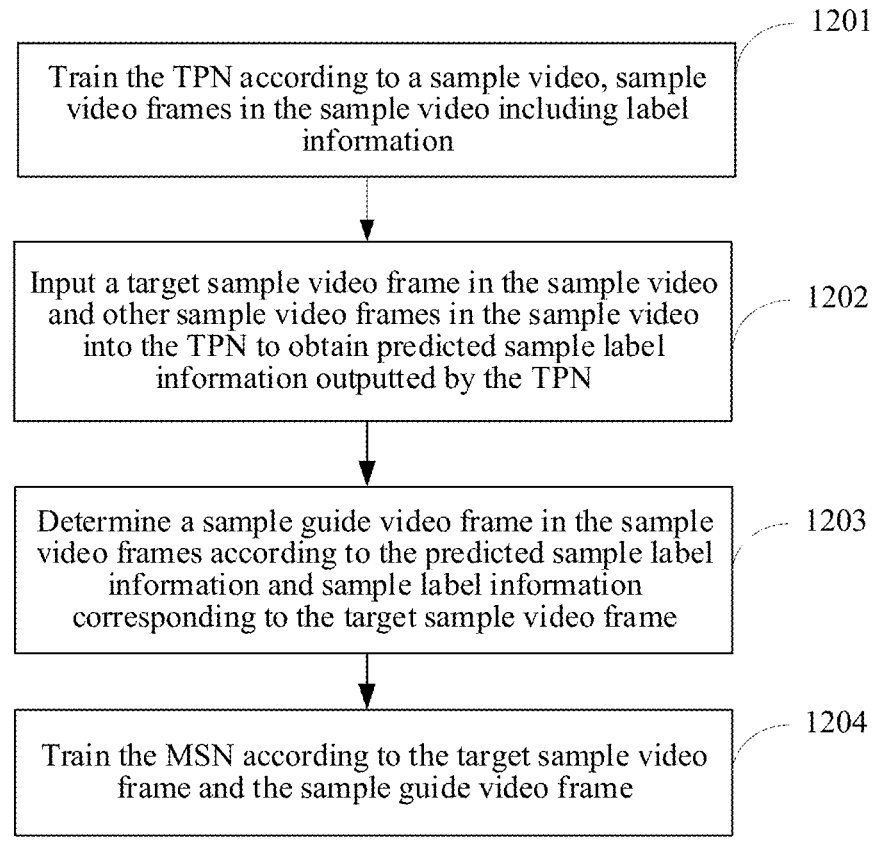
FIG. 12 is a flowchart of a network training process according to an exemplary embodiment.

For a training method of the TPN and the MSN in the foregoing embodiment, in one embodiment, as shown in FIG. 12, a network training process includes the following steps:

Step 1201. Train the TPN according to a sample video, sample video frames in the sample video including label information.

In one embodiment, the computer device first uses a sample video including label information to train the TPN, and then further trains the MSN based on the sample video and the trained TPN.

In some embodiments, the computer device randomly selects two frames from the sample video as a guide video frame and a target video frame to train the TPN. When the TPN is used to implement video object segmentation, the computer device uses an intersection over union (IOU) loss function to train the TPN; and when the TPN is used to implement video coloring, the computer device uses an L1 regression loss function to train the TPN.

Step 1202. Input a target sample video frame in the sample video and other sample video frames in the sample video into the TPN to obtain predicted sample label information outputted by the TPN.

After training the TPN, the computer device further uses the trained TPN to generate a training sample, thereby using the training sample to train the MSN.

In one embodiment, for a target sample video frame x_t in the sample video, the computer device traverses video frames previous to the target sample video frame and uses the video frames as sample guide video frames x_p ($0 \leq p \leq t-1$), and inputs the target sample video frame x_t and the sample guide video frames x_p into the TPN, to obtain predicted sample label information y_tp outputted by the TPN.

Step 1203. Determine a sample guide video frame in the sample video frames according to the predicted sample label information and sample label information corresponding to the target sample video frame.

Further, the computer device determines guide quality of the sample guide video frame by comparing the predicted sample label information and the sample label information corresponding to the target sample video frame, and then performs positive and negative sample classification on the sample guide video frames. In one embodiment, this step may include the following steps.

1. Calculate information accuracy between the predicted sample label information and the sample label information.

In one embodiment, the computer device calculates the information accuracy between the predicted sample label information and the sample label information. Higher information accuracy indicates that the predicted sample label information is closer to the sample label information, and correspondingly, indicates higher quality of the sample guide video frame corresponding to the predicted sample label information.

In a schematic example, the computer device calculates information accuracy s_tp of the predicted sample label information y_tp and the label information y_t of the target sample video frame x_t according to the predicted sample label information y_tp and the label information y_t of the target sample video frame x_t.

2. Determine a positive sample guide video frame and a negative sample guide video frame in the sample video frames according to the information accuracy.

First information accuracy corresponding to the positive sample guide video frame is higher than second information accuracy corresponding to the negative sample guide video frame, the first information accuracy being information accuracy of performing information labelling on the target sample video frame according to the positive sample guide video frame, and the second information accuracy being information accuracy of performing information labelling on the target sample video frame according to the negative sample guide video frame.

In one embodiment, if the information accuracy is greater than a first accuracy threshold, the computer device determines the sample guide video frame as a positive sample guide video frame (that is, suitable as a guide video frame); and if the information accuracy is less than a second accuracy threshold, the computer device determines the sample guide video frame as a negative sample guide video frame (that is, not suitable as a guide video frame). The first accuracy threshold is greater than or equal to the second accuracy threshold, for example, the first accuracy threshold is 0.8, and the second accuracy threshold is 0.4.

Step 1204. Train the MSN according to the target sample video frame and the sample guide video frame.

In one embodiment, the computer device inputs the target sample video frame and the sample guide video frame into the MSN to obtain a prediction result outputted by the MSN, and trains the MSN according to the prediction result and a positive/negative attribute of the sample guide video frame. The computer device may use a back propagation algorithm or a gradient descent algorithm to train the MSN. This is not limited in this embodiment of the present disclosure.

In this embodiment, the computer device first trains the TPN according to the sample video, performs positive and negative sample division on the sample video frames in the sample video based on the trained TPN, and then uses positive and negative samples obtained through the division to train the MSN, without the need for the user to manually label a positive/negative attribute of a training sample in advance, which reduces the difficulty of obtaining the training sample, and helps improve the accuracy of training sample division, thereby improving the quality for selecting the guide frame of the MSN.

Figure 13:
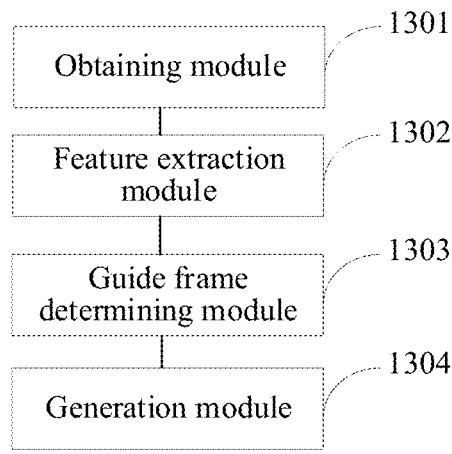
FIG. 13 is a structural block diagram of an apparatus for labelling information of a video frame according to an exemplary embodiment of the present disclosure.

FIG. 13 is a structural block diagram of an apparatus for labelling information of a video frame according to an exemplary embodiment of the present disclosure. As shown in FIG. 13, the apparatus includes:

an obtaining module 1301, configured to obtain a video;

a feature extraction module 1302, configured to perform feature extraction on a target video frame in the video, to obtain a target image feature of the target video frame;

a guide frame determining module 1303, configured to determine, according to image feature matching degrees between the target video frame and labelled video frames, a guide video frame of the target video frame from the labelled video frames, the labelled video frames belonging to the video, the guide video frame being used for guiding the target video frame for information labelling, the image feature matching degrees being matching degrees between the target image feature and image features corresponding to the labelled video frames, and an image feature matching degree between the guide video frame and the target video frame being higher than image feature matching degrees between other labelled video frames and the target video frame; and a generation module 1304, configured to generate target label information corresponding to the target video frame according to label information corresponding to the guide video frame.

The guide frame determining module 1303 includes:

a first obtaining unit, configured to obtain a candidate image feature from a memory pool of an MSN, the MSN including the memory pool and a selection network, and the memory pool storing the image features of the labelled video frames;

a feature scoring unit, configured to input the candidate image feature and the target image feature into the selection network to obtain an image feature score outputted by the selection network, the image feature score being used for indicating an image feature matching degree between the candidate image feature and the target image feature; and a determining unit, configured to determine a labelled video frame corresponding to a highest image feature score as the guide video frame.

The apparatus further includes:

a storage module, configured to store the target image feature of the target video frame into the memory pool.

In some embodiments, the guide frame determining module 1303 further includes:

a second obtaining unit, configured to obtain a labelled object image feature of a labelled object in an initially labelled video frame, the initially labelled video frame being a video frame with preset label information in the video, and the labelled object being an object including label information in the initially labelled video frame; and the feature scoring unit is further configured to:

input the candidate image feature, the target image feature, and the labelled object image feature into the selection network to obtain the image feature score outputted by the selection network.

In some embodiments, the selection network includes a first selection branch and a second selection branch; and the feature scoring unit is further configured to:

perform an association operation on any two image features among the candidate image feature, the target image feature, and the labelled object image feature to obtain an associated image feature, the associated image feature being used for indicating a similarity between the image features;

concatenate associated image features, and input the concatenated associated image features into the first selection branch, to obtain a first feature vector outputted by the first selection branch;

concatenate the candidate image feature, the target image feature, and the labelled object image feature to obtain a concatenated result as an input into the second selection branch to obtain a second feature vector outputted by the second selection branch; and determine the image feature score according to the first feature vector and the second feature vector.

In some embodiments, the first obtaining unit is configured to:

obtain, when a frame rate of the video is greater than a frame rate threshold, candidate image features corresponding to labelled video frames from the memory pool every predetermined quantity of frames, or obtain candidate image features of n adjacent labelled video frames corresponding to the target video frame from the memory pool, n being a positive integer.

In some embodiments, the generation module 1304 is configured to:

input the guide video frame, the label information corresponding to the guide video frame, and the target video frame into a TPN, to obtain the target label information outputted by the TPN.

In some embodiments, the TPN includes an appearance branch and a motion branch; and the generation module 1304 includes:

a first output unit, configured to input the label information corresponding to the guide video frame and the target video frame into the appearance branch, to obtain an image information feature outputted by the appearance branch;

a second output unit, configured to determine a video frame optical flow between the guide video frame and the target video frame, and input the video frame optical flow and the label information corresponding to the guide video frame into the motion branch to obtain a motion feature outputted by the motion branch; and a determining unit, configured to determine the target label information according to the image information feature and the motion feature.

In some embodiments, the apparatus further includes:

a first training module, configured to train the TPN according to a sample video, sample video frames in the sample video including label information;

a label information prediction module, configured to input a target sample video frame in the sample video and other sample video frames in the sample video into the TPN to obtain predicted sample label information outputted by the TPN;

a sample determining module, configured to determine a sample guide video frame in the sample video frames according to the predicted sample label information and sample label information corresponding to the target sample video frame; and a second training module, configured to train the MSN according to the target sample video frame and the sample guide video frame.

In some embodiments, the sample determining module includes:

a calculation unit, configured to calculate information accuracy between the predicted sample label information and the sample label information; and a determining unit, configured to determine a positive sample guide video frame and a negative sample guide video frame in the sample video frames according to the information accuracy, first information accuracy corresponding to the positive sample guide video frame being higher than second information accuracy corresponding to the negative sample guide video frame, the first information accuracy being information accuracy of performing information labelling on the target sample video frame according to the positive sample guide video frame, and the second information accuracy being information accuracy of performing information labelling on the target sample video frame according to the negative sample guide video frame.

Based on the above, in this embodiment of the present disclosure, when information labelling is performed on the target video frame in the video, the target image feature of the target video frame is obtained by performing feature extraction on the target video frame; and the guide video frame corresponding to the target video frame is determined from the labelled video frames according to the image feature matching degrees between the target video frame and the labelled video frames in the video, thereby generating the target label information of the target video frame based on the label information of the guide video frame. In this embodiment of the present disclosure, an adjacent video frame is not directly selected as the guide video frame, but instead, a labelled video frame having a high image feature matching degree with the target video frame is selected as the guide video frame based on the image feature of the target video frame, thereby improving selection quality for the guide video frame, and further improving accuracy of the generated label information. In addition, propagation errors of the label information do not accumulate, thereby improving propagation quality for the label information.

The apparatus for labelling information of a video frame provided in the foregoing embodiment is illustrated only with an example of division of the foregoing functional modules. In actual application, the functions may be allocated to and completed by different functional modules according to requirements, that is, the internal structure of the apparatus is divided into different functional modules, to implement all or some of the functions described above. In addition, the apparatus for labelling information of a video frame provided in the foregoing embodiment belongs to the same conception as the embodiment of the method for labelling information of a video frame. For a specific implementation process thereof, reference may be made to the method embodiment, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 14:
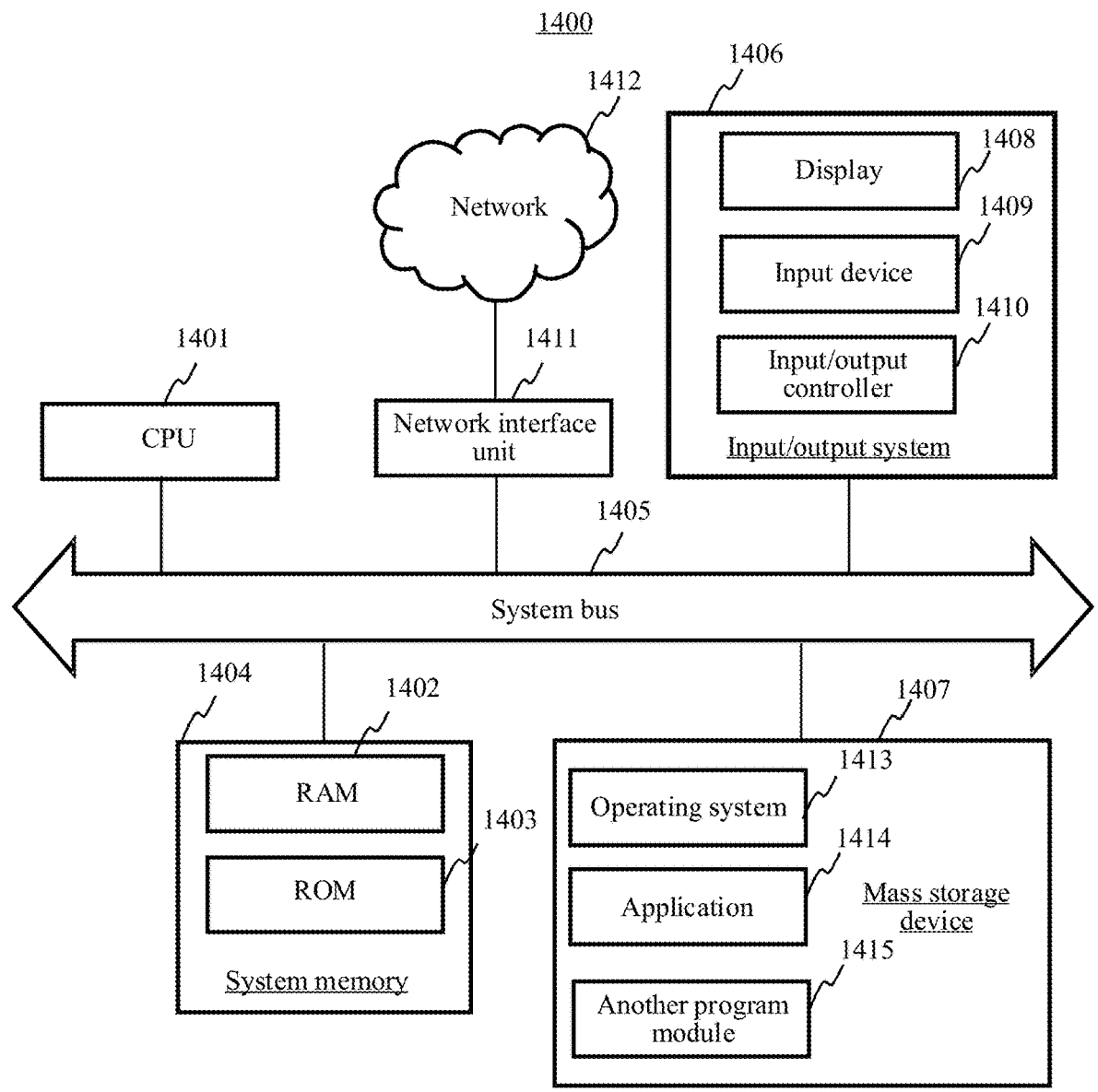
FIG. 14 is a schematic structural diagram of a computer device according to an exemplary embodiment of the present disclosure.

FIG. 14 is a schematic structural diagram of a computer device according to an exemplary embodiment of the present disclosure. Specifically, the computer device 1400 includes a central processing unit (CPU) 1401, a system memory 1404 including a random access memory (RAM) 1402 and a read-only memory (ROM) 1403, and a system bus 1405 connecting the system memory 1404 and the CPU 1401. The computer device 1400 further includes a basic input/output (I/O) system 1406 assisting in transmitting information between components in a computer, and a mass storage device 1407 configured to store an operating system 1413, an application 1414, and another program module 1415.

The basic I/O system 1406 includes a display 1408 configured to display information and an input device 1409 such as a mouse or a keyboard that is configured for information inputting by a user. The display 1408 and the input device 1409 are both connected to the CPU 1401 by an input/output controller 1410 connected to the system bus 1405. The basic I/O system 1406 may further include the input/output controller 1410, to receive and process inputs from a plurality of other devices, such as a keyboard, a mouse, or an electronic stylus. Similarly, the input/output controller 1410 further provides an output to a display screen, a printer, or other type of output device.

The mass storage device 1407 is connected to the CPU 1401 through a mass storage controller (not shown) connected to the system bus 1405. The mass storage device 1407 and an associated computer-readable medium provide non-volatile storage for the computer device 1400. That is, the mass storage device 1407 may include a computer-readable medium (not shown), such as a hard disk or a CD-ROM drive.

Without loss of generality, the computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an EPROM, an EEPROM, a flash memory or another solid-state storage technology, a CD-ROM, a DVD or another optical storage, a magnetic cassette, a magnetic tape, or a magnetic disk storage or another magnetic storage device. Certainly, a person skilled in the art may learn that the computer storage medium is not limited to the foregoing several types. The system memory 1404 and the mass storage device 1407 may be collectively referred to as a memory.

The memory stores one or more programs, and the one or more programs are configured to be executed by one or more CPUs 1401. The one or more programs include instructions used for implementing the foregoing method, and the CPU 1401 executes the one or more programs to implement the method provided in the foregoing method embodiments.

According to the various embodiments of the present disclosure, the computer device 1400 may further be connected, through a network such as the Internet, to a remote computer on the network for running. That is, the computer device 1400 may be connected to a network 1412 by using a network interface unit 1411 connected to the system bus 1405, or may be connected to another type of network or a remote computer system (not shown) by using a network interface unit 1411.

The memory further includes one or more programs. The one or more programs are stored in the memory and include steps to be executed by the computer device in the method provided in the embodiments of the present disclosure.

An embodiment of the present disclosure further provides a computer-readable storage medium, storing at least one instruction, at least one program, a code set, or an instruction set, the at least one instruction, the at least one program, the code set, or the instruction set being loaded and executed by a processor to implement the method for labelling information of a video frame according to any one of the foregoing embodiments.

The present disclosure further provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the method for labelling information of a video frame provided in the foregoing embodiment.

A person of ordinary skill in the art may understand that all or some of the steps of the methods in the foregoing embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set, or an instruction set, the at least one instruction, the at least one program, the code set, or the instruction set being loaded and executed by the processor to implement the method for labelling information of a video frame according to any one of the foregoing method embodiments.

In some embodiments, the computer-readable storage medium may include: a ROM, a RAM, a solid state drive (SSD), an optical disc, or the like. The RAM may include a resistance random access memory (ReRAM) and a dynamic random access memory (DRAM). The sequence numbers of the foregoing embodiments of the present disclosure are merely for description purpose, and are not intended to indicate priorities of the embodiments.

A person of ordinary skill in the art may understand that all or some of the steps in the foregoing embodiments may be implemented by hardware or a program instructing relevant hardware. The program may be stored in a computer-readable storage medium. The storage medium may be: a ROM, a magnetic disk, or an optical disc, or the like.

The foregoing descriptions are merely exemplary embodiments of the present disclosure, and are not intended to limit the present disclosure. Any modification, equivalent replacement, improvement and the like made within the spirit and principle of the present disclosure shall fall within the protection scope of the present disclosure.

What is claimed is:

1. A method for labelling information of a video frame, applied to a computer device, the method comprising:

obtaining a video;

performing feature extraction on a target video frame in the video, to obtain a target image feature of the target video frame;

determining, according to image feature matching degrees between the target video frame and labelled video frames, a guide video frame of the target video frame from the labelled video frames, the labelled video frames belonging to the video, the guide video frame being used for guiding the target video frame for information labelling, the image feature matching degrees being matching degrees between the target image feature and image features corresponding to the labelled video frames, and an image feature matching degree between the guide video frame and the target video frame being higher than image feature matching degrees between other labelled video frames and the target video frame; and generating target label information corresponding to the target video frame according to label information corresponding to the guide video frame, wherein determining the guide video frame of the target video frame from the labelled video frames comprises:

obtaining a labelled object image feature of a labelled object in an initially labelled video frame, the initially labelled video frame being a video frame with preset label information in the video, and the labelled object being an object comprising label information in the initially labelled video frame;

obtaining a candidate image feature from a memory pool of a memory selection network (MSN), the MSN comprising the memory pool and a selection network, and the memory pool storing the image features of the labelled video frames;

inputting the candidate image feature, the labelled object image feature, and the target image feature into the selection network to obtain an image feature score outputted by the selection network, the image feature score indicating an image feature matching degree between the candidate image feature and the target image feature; and determining a labelled video frame corresponding to a highest image feature score as the guide video frame; and the method further comprises: storing the target image feature of the target video frame into the memory pool.

2. The method according to claim 1, wherein the selection network comprises a first selection branch and a second selection branch; and the inputting the candidate image feature, the target image feature, and the labelled object image feature into the selection network to obtain the image feature score outputted by the selection network comprises:

performing an association operation on any two image features among the candidate image feature, the target image feature, and the labelled object image feature to obtain three associated image features, each associated image feature indicating a similarity between the two corresponding image features;

concatenating the associated image features, and inputting the concatenated associated image features into the first selection branch, to obtain a first feature vector outputted by the first selection branch;

concatenating the candidate image feature, the target image feature, and the labelled object image feature to obtain a concatenated result, and inputting the concatenated result into the second selection branch to obtain a second feature vector outputted by the second selection branch; and determining the image feature score according to the first feature vector and the second feature vector.

3. The method according to claim 1, wherein the obtaining a candidate image feature from a memory pool of an MSN comprises:

obtaining, when a frame rate of the video is greater than a frame rate threshold, candidate image features corresponding to labelled video frames from the memory pool every predetermined quantity of frames, or obtaining candidate image features of n adjacent labelled video frames corresponding to the target video frame from the memory pool, n being a positive integer.

4. The method according to claim 1, wherein the generating target label information corresponding to the target video frame according to label information corresponding to the guide video frame comprises:

inputting the guide video frame, the label information corresponding to the guide video frame, and the target video frame into a temporal propagation network (TPN), to obtain the target label information outputted by the TPN.

5. The method according to claim 4, wherein the TPN comprises an appearance branch and a motion branch; and the inputting the guide video frame, the label information corresponding to the guide video frame, and the target video frame into a TPN, to obtain the target label information outputted by the TPN comprises:

inputting the label information corresponding to the guide video frame and the target video frame into the appearance branch, to obtain an image information feature outputted by the appearance branch;

determining a video frame optical flow between the guide video frame and the target video frame, and inputting the video frame optical flow and the label information corresponding to the guide video frame into the motion branch to obtain a motion feature outputted by the motion branch; and determining the target label information according to the image information feature and the motion feature.

6. The method according to claim 4, wherein before the obtaining a video, the method further comprises:

training the TPN according to a sample video, sample video frames in the sample video comprising label information;

inputting a target sample video frame in the sample video and other sample video frames in the sample video into the TPN to obtain predicted sample label information outputted by the TPN;

determining a sample guide video frame in the sample video frames according to the predicted sample label information and sample label information corresponding to the target sample video frame; and training the MSN according to the target sample video frame and the sample guide video frame.

7. The method according to claim 6, wherein the determining a sample guide video frame in the sample video frames according to the predicted sample label information and sample label information corresponding to the target sample video frame comprises:

calculating information accuracy between the predicted sample label information and the sample label information; and determining a positive sample guide video frame and a negative sample guide video frame in the sample video frames according to the information accuracy, wherein first information accuracy of performing information labelling on the target sample video frame according to the positive sample guide video frame is higher than second information accuracy of performing information labelling on the target sample video frame according to the negative sample guide video frame.

8. An apparatus for labelling information of a video frame, comprising a processor and a memory, the memory storing computer instructions that, when being loaded and executed by the processor, cause the processor to:

obtain a video;

perform feature extraction on a target video frame in the video, to obtain a target image feature of the target video frame;

determine, according to image feature matching degrees between the target video frame and labelled video frames, a guide video frame of the target video frame from the labelled video frames, the labelled video frames belonging to the video, the guide video frame being used for guiding the target video frame for information labelling, the image feature matching degrees being matching degrees between the target image feature and image features corresponding to the labelled video frames, and an image feature matching degree between the guide video frame and the target video frame being higher than image feature matching degrees between other labelled video frames and the target video frame; and generate target label information corresponding to the target video frame according to label information corresponding to the guide video frame, wherein the computer instructions further causes the processor to:

obtain a labelled object image feature of a labelled object in an initially labelled video frame, the initially labelled video frame being a video frame with preset label information in the video, and the labelled object being an object comprising label information in the initially labelled video frame;

obtain a candidate image feature from a memory pool of a memory selection network (MSN), the MSN comprising the memory pool and a selection network, and the memory pool storing the image features of the labelled video frames;

input the candidate image feature, the labelled object image feature, and the target image feature into the selection network to obtain an image feature score outputted by the selection network, the image feature score indicating an image feature matching degree between the candidate image feature and the target image feature;

determine a labelled video frame corresponding to a highest image feature score as the guide video frame; and store the target image feature of the target video frame into the memory pool.

9. The apparatus according to claim 8, wherein the selection network comprises a first selection branch and a second selection branch; and the computer instructions further causes the processor to:

perform an association operation on any two image features among the candidate image feature, the target image feature, and the labelled object image feature to obtain three associated image features, each associated image feature indicating a similarity between the two corresponding image features;

concatenate associated image features, and input the concatenated associated image features into the first selection branch, to obtain a first feature vector outputted by the first selection branch;

concatenate the candidate image feature, the target image feature, and the labelled object image feature to obtain a concatenated result, and input the concatenated result into the second selection branch to obtain a second feature vector outputted by the second selection branch; and determine the image feature score according to the first feature vector and the second feature vector.

10. The apparatus according to claim 8, wherein the computer instructions further causes the processor to:

obtaining, when a frame rate of the video is greater than a frame rate threshold, candidate image features corresponding to labelled video frames from the memory pool every predetermined quantity of frames, or obtaining candidate image features of n adjacent labelled video frames corresponding to the target video frame from the memory pool, n being a positive integer.

11. The apparatus according to claim 8, wherein the computer instructions further causes the processor to:

input the guide video frame, the label information corresponding to the guide video frame, and the target video frame into a temporal propagation network (TPN), to obtain the target label information outputted by the TPN.

12. The apparatus according to claim 11, wherein the TPN comprises an appearance branch and a motion branch; and the inputting the guide video frame, the label information corresponding to the guide video frame, and the target video frame into a TPN, to obtain the target label information outputted by the TPN comprises:

inputting the label information corresponding to the guide video frame and the target video frame into the appearance branch, to obtain an image information feature outputted by the appearance branch;

determining a video frame optical flow between the guide video frame and the target video frame, and inputting the video frame optical flow and the label information corresponding to the guide video frame into the motion branch to obtain a motion feature outputted by the motion branch; and determining the target label information according to the image information feature and the motion feature.

13. The apparatus according to claim 11, wherein before the obtaining a video, the computer instructions further causes the processor to perform:

training the TPN according to a sample video, sample video frames in the sample video comprising label information;

inputting a target sample video frame in the sample video and other sample video frames in the sample video into the TPN to obtain predicted sample label information outputted by the TPN;

determining a sample guide video frame in the sample video frames according to the predicted sample label information and sample label information corresponding to the target sample video frame; and training the MSN according to the target sample video frame and the sample guide video frame.

14. The apparatus according to claim 13, wherein the determining a sample guide video frame in the sample video frames according to the predicted sample label information and sample label information corresponding to the target sample video frame comprises:

calculating information accuracy between the predicted sample label information and the sample label information; and determining a positive sample guide video frame and a negative sample guide video frame in the sample video frames according to the information accuracy, wherein first information accuracy of performing information labelling on the target sample video frame according to the positive sample guide video frame is higher than second information accuracy of performing information labelling on the target sample video frame according to the negative sample guide video frame.

15. A non-transitory computer-readable storage medium, storing at least one instruction, at least one program, a code set, or an instruction set, the at least one instruction, the at least one program, the code set, or the instruction set being loaded and executed by a processor to implement:

obtaining a video;

performing feature extraction on a target video frame in the video, to obtain a target image feature of the target video frame;

determining, according to image feature matching degrees between the target video frame and labelled video frames, a guide video frame of the target video frame from the labelled video frames, the labelled video frames belonging to the video, the guide video frame being used for guiding the target video frame for information labelling, the image feature matching degrees being matching degrees between the target image feature and image features corresponding to the labelled video frames, and an image feature matching degree between the guide video frame and the target video frame being higher than image feature matching degrees between other labelled video frames and the target video frame; and generating target label information corresponding to the target video frame according to label information corresponding to the guide video frame, wherein determining the guide video frame of the target video frame from the labelled video frames comprises:

obtaining a labelled object image feature of a labelled object in an initially labelled video frame, the initially labelled video frame being a video frame with preset label information in the video, and the labelled object being an object comprising label information in the initially labelled video frame;

obtaining a candidate image feature from a memory pool of a memory selection network (MSN), the MSN comprising the memory pool and a selection network, and the memory pool storing the image features of the labelled video frames;

inputting the candidate image feature, the labelled object image feature, and the target image feature into the selection network to obtain an image feature score outputted by the selection network, the image feature score indicating an image feature matching degree between the candidate image feature and the target image feature; and determining a labelled video frame corresponding to a highest image feature score as the guide video frame; and the at least one instruction, the at least one program, the code set, or the instruction set further cause the processor to implement: storing the target image feature of the target video frame into the memory pool.

* * * * *